(12) United States Patent
Hori et al.

(10) Patent No.: US 6,491,340 B2
(45) Date of Patent: Dec. 10, 2002

(54) SUNROOF APPARATUS FOR A VEHICLE

(75) Inventors: Kenji Hori, Chiryu (JP); Nobuyasu Bessho, Toyota (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/965,082

(22) Filed: Sep. 28, 2001

(65) Prior Publication Data

US 2002/0041113 A1 Apr. 11, 2002

(30) Foreign Application Priority Data

Sep. 28, 2000  (JP) ........................................ 2000-297685

(51) Int. Cl.[7] .............................................. B60J 7/057
(52) U.S. Cl. ...................................... 296/214; 296/223
(58) Field of Search ................................. 296/214, 223

(56) References Cited

U.S. PATENT DOCUMENTS

| | | | |
|---|---|---|---|
| 4,671,564 A | * 6/1987 | Sumida et al. | ............... 296/214 |
| 4,981,290 A | * 1/1991 | Huyer | ........................ 296/214 |
| 5,250,882 A |  10/1993 | Odoi et al. | .................. 318/467 |
| 5,558,394 A | * 9/1996 | Mori et al. | .................. 296/214 |
| 5,673,965 A | * 10/1997 | Lenknes | ..................... 296/214 |

* cited by examiner

Primary Examiner—Dennis H. Pedder
(74) Attorney, Agent, or Firm—Finnegan, Henderson, Farabow, Garrett & Dunner, L.L.P.

(57) ABSTRACT

A sunroof apparatus which includes an outer panel opening and closing an open portion formed in a vehicular roof panel, a sunshade panel provided at an interior side of the vehicle relative to the outer panel and shading and exposing the interior side through the outer panel, a driving mechanism associated with the outer panel and the sunshade panel, a first clutch mechanism establishing engaged and disengaged states between the driving mechanism and the outer panel and a second clutch mechanism establishing engaged and disengaged states between the driving mechanism and the sunshade panel. The first clutch mechanism engages between the driving mechanism and the outer panel when the driving mechanism drives in one direction while the open portion is closed by the movable pane. The second clutch mechanism engages between the driving mechanism and the sunshade panel when the driving mechanism drives in other direction while the open portion is closed by the outer panel.

4 Claims, 15 Drawing Sheets

SUNROOF APPARATUS FOR A VEHICLE

CROSS REFERENCE TO RELATED APPLICATIONS

The present application is based on and claims priority under 35 U.S.C §119 with respect to Japanese Patent Application No.2000-297685 filed on Sep. 28, 2000, the entire content of which is incorporated herein by reference.

FIELD OF THE INVENTION

The present invention is generally directed to a sunroof apparatus includes a outer panel and a sunshade panel which are electrically moves.

BACKGROUND OF THE INVENTION

One of the conventional sunroof apparatus of the type is disclosed in U.S. Pat. No. 5,250,882. This conventional sunroof apparatus includes an outer panel, a sunshade panel, first driving mechanism and a second driving mechanism. The outer panel is opening and closing an open portion formed in a vehicular roof panel. The sunshade panel is provided at an interior side of the vehicle relative to the outer panel and shading and exposing the interior side through the outer panel. The first driving mechanism is associated with the outer panel to slide. The second driving mechanism is associated with the sunshade panel to slide.

In this conventional sunroof apparatus, the outer panel slides by the first driving mechanism and the sunshade panel slides by the second driving mechanism, respectively.

However, in the conventional sunroof apparatus having two independent driving mechanisms. The first and. second driving mechanisms are required to slide the outer panel and the sunshade panel, respectively. Thus, due to the plural or increased number of the driving mechanisms, the number of parts is increased, which results in that the production cost of the sunroof apparatus becomes higher and a control circuit for controlling both of the first and second driving mechanisms becomes much complicated.

A need exists to provide a sunroof apparatus in which outer and sunshade panels can be slid by a sole driving mechanism, for overcoming the aforementioned drawbacks.

SUMMARY OF THE INVENTION

The present invention has been developed to satisfy the request noted above and the present invention provides a sunroof apparatus which includes an outer panel opening and closing an open portion formed in a vehicular roof panel, a sunshade panel provided at an interior side of the vehicle relative to the outer panel and shading and exposing the interior side through the outer panel, a driving mechanism associated with the outer panel and the sunshade panel, a first clutch mechanism establishing engaged and disengaged states between the driving mechanism and the outer panel and a second clutch mechanism establishing engaged and disengaged states between the driving mechanism and the sunshade panel. The first clutch mechanism engages between the driving mechanism and the outer panel when the driving mechanism drives in one direction while the open portion is closed by the movable pane. The second clutch mechanism engages between the driving mechanism and the sunshade panel when the driving mechanism drives in other direction while the open portion is closed by the outer panel.

In accordance with the aspect of the present invention, When the driving mechanism drives in one direction, the outer panel slides by the first clutch mechanism. When the driving mechanism drives in the other direction, the sunshade panel slides by the second clutch mechanism. Therefore, only the driving mechanism is capable of causing the outer panel and the sunshade panel to slide.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Hereinafter, a preferred embodiment of a sunroof apparatus in accordance with the present invention will be described, in great detail, with reference to the attached drawings.

Figure 1:
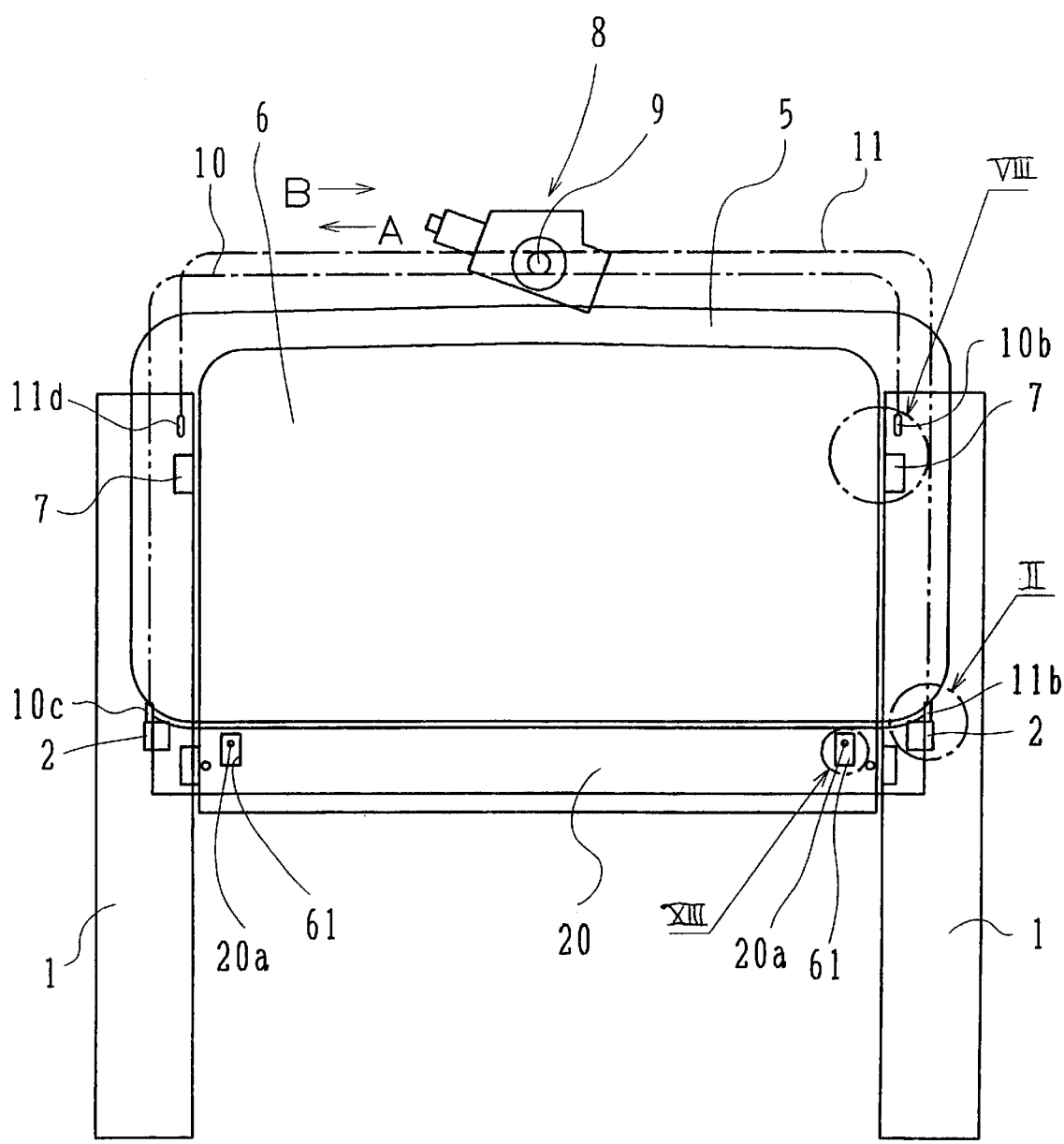
FIG. 1 illustrates a front view of a preferred embodiment of a sunroof apparatus in accordance with the present invention.

As shown in FIG. 1, a pair of guide rails 1 and 1 which extend along inner right and left edges of an opening portion which is formed in a vehicular roof panel of a vehicle. A driving shoe 3 (shown in FIGS. 2 to 7 inclusive) having a clutch plate 2 which will be detailed later is supported by each of the guide rails 1 and 1 in sliding mode. A outer panel 5 is supported on the driving shoe 3 by way of a well-known link mechanism 4 (shown in FIG. 3). When the driving shoe 3 slides, together with the clutch plate 2, along the guide rail 1, the outer panel 5 is brought into sliding movement in a vehicular lengthwise direction (which corresponds to the vertical direction in FIG. 1) to open/close the opening portion of the roof panel 1. When the outer panel 5 brings the roof panel open portion to its close state to open state, prior to the sliding movement of the outer panel 5, a rear end of the outer panel 5 is made lowered by an actuation of the link mechanism 4. On the other hand, when the outer panel 5 brings the roof panel open portion prior to the close state from the open state, upon completion of the sliding movement of the outer panel 5, the rear end thereof is made raised by actuating the link mechanism 4. Thus, while the roof panel open portion is being in the close state, the roof panel and the movable panel 5 are substantially coplanar with each other. It is to be noted that in addition to raising and lowering the rear end of the outer panel 5 a front end thereof may be raised and lowered.

The pair of guide rails 1 and 1 support right and left sides of a sunshade panel 6 by way of clutch blocks 7 and 7, respectively, in sliding mode. The sunshade panel 6 is placed at an interior side of the vehicle and when moving the clutch blocks 7 and 7 along the respective guide rails 1 and 1 the sunshade panel 6 is brought into vehicular lengthwise sliding movement, which makes it possible to shield or expose the outer panel 5 from the interior side.

A driving mechanism 8 which is in association with the outer panel 5 and the sunshade panel 6, includes an output pinion gear 9 as well as a motor and a reducer gear mechanism. The output pinion gear 9 is in meshing engagement with spiral gears 10a and 11a which are formed integrally on a pair of cables 10 and 11, respectively. The pair of cables 10 and 11 are made moved in opposite directions by the output pinion 9 in rotation while the driving mechanism 8 is being turned on. End pieces 10b and 11b fixed to ends of the cables 10 and 11 are connected to the clutch plate 2 and the clutch block 7, respectively, and the driving force issued from the driving mechanism 8 is transmitted to the outer panel 5 and the sunshade panel 6, thereby establishing the sliding movements of the respective outer panel 5 and sunshade panel 6.

As shown in FIGS. 2 to 12 inclusive, the guide rail 1, which is formed into a longitudinally extending member, is of a substantially U-shaped cross-section which is made up of a pair of parallely extending vertical walls 12 and 13 defining a fixed span therebetween and a bottom wall 14 connecting both the vertical walls 12 and 13. The vertical walls 12 and 13 is formed therein with shoe grooves 12a and 13a which open inwardly. In addition, the vertical wall 12 is formed therein with a shoe groove 12b which opens outwardly. Moreover, the vertical wall 12 is formed therein with a cable groove 12c which is in continuous with the shoe groove 12b, while the vertical wall 13 is formed therein with a cable groove 13c which is in continuous with the shoe groove 13b. The end piece 10b fixed to one end (right end in FIG. 1) of the cable 10 is movable inserted in cable groove 12c to be guided therealong, while the end piece 11b fixed to one end (right end in FIG. 1) of the cable 11 is movable inserted in cable groove 13c to be guided therealong. The end piece 11b has an integral engaging flange 11c which extends into the shoe groove 13a. At a fixed position of the vertical wall 12, a notch 12d is formed whose opening direction is identical with the shoe groove 12a. Moreover, At another fixed position of the vertical wall 12, there is secured a pressure urging pin 12e which traverses or passes through the shoe groove 12c.

As shown in FIGS. 2 to 7 inclusive, the driving shoe 3 is in sliding support by the guide rail 1 in such a manner that both sides of the driving shoe 3 are in sliding engagement with the shoe grooves 12a and 13a, respectively, and supports a pivot link 15 of the link mechanism 4 at a pin 16 so that the pivot link 15 can pivot. The driving shoe 3 is fixedly connected with a bracket 17 by a bolt 18. On the bracket 17, the clutch plate 2 is supported by a pin 19 so as to be rotatable about the pin 19. The clutch plate 2 is located within the guide rail 1 in such a manner that both sides of the clutch plate 2 are placed in the shoe grooves 12a and 13a, respectively. At a side of the vertical wall 13, the side of the clutch plate 12 is formed with a notch 21 which is capable of being engaged with the engaging flange 11c of the end piece 11b of the cable 11. In addition, at the side of the vertical wall 12, the side of the clutch plate 2 is formed with an abutting wall 22 which is capable of being engaged with an end surface of the engaging flange 11c such that the abutting wall 22 is made continuous with the notch 21 so as to opposes to the end surface of the engaging flange 11c. At a side of the vertical wall 12, the side of the clutch plate 12 is formed with a projection 23 which is capable of being engaged with the notch 12d of the guide rail 1. Between the clutch plate 2 and the bracket 17a, a spring 24 is disposed in extension fashion in such a manner that both ends of the spring 24 are engaged with an engaging portion formed on the clutch plate 2 and an engaging portion 6a formed at the bracket 6, respectively. The clutch plate 2 is continually biased with an urging force of the spring 24 to rotate in the counterclockwise direction in FIG. 2 in such a manner that the notch 21 is made being out of engagement with the flange 11c and the projection 23 is made being engaged with the notch 12d. It is to be noted that the driving shoe 3 is formed therein with a passage 3a through which the end piece 11c at one end of the cable 11 which extends into the shoe groove 13e.

As shown in FIGS. 8 to 12 inclusive, the clutch block 7 is in sliding engagement with the shoe groove 12e of the guide rail 1 and thus is in slidable support by the guide rail 1. A periphery (upper periphery in FIG. 8) of the clutch plate 7 which opposes to the cable groove 12e of the guide rail 1 is a gear portion 71 which is capable of being in meshing engagement with the spiral gear 10a at one end of the cable 10. Teeth of the gear portion 71 are shaped in such a manner that the spiral gear 10a of the cable 10 climes over teeth of the gear portion 71 in turn when the cable 10 is moved to slide the sunshade panel 6 to open (in the rightward direction in FIG. 8), while the spiral gear 10a of the cable 10 is in mesh engagement with the teeth of the gear portion 71 when the cable 10 is moved to slide the sunshade panel 6 to close (in the leftward direction in FIG. 8). At another periphery of the clutch block 7 which opposes to the cable groove 12c, abutting wall 72 is formed in projection fashion so as to extend into the cable groove 12c. This abutting wall 72 is placed to oppose to the end piece 10b at one end of the cable 10 and is made engageble therewith. At a front (leftward in FIG. 8) end of the clutch block 7, there are formed a slant surface 73 which is capable of being engaged with the pin 12e and a groove 74 which is continuous with the slant surface 73 and which is capable of being engaged with the pin 12e. The slant surface 73 is made in such manner that its thickness increases toward a rear side (rightward in FIG. 8) of the clutch block 7 i.e. the periphery of the clutch block 7 which opposes to the cable groove 12c of the guide rail 1. Between the clutch block 7 and the sunshade panel 6, there is provided a leaf spring 75 whose both ends are engaged with a periphery of the clutch block 7 which is the other side of the periphery opposing to the cable groove 12c and whose mid portion is formed with a flange 75b to be fixed to the sunshade panel 6 by a screw 76. This leaf spring 75 connects the clutch block 7 and the sunshade panel 6 and continually urges the clutch block 7 in the clockwise direction in FIG. 8 about the screw 76 in such a manner that the gear portion 71 is made extended into the cable groove 12c of the guide rail 1. An engagement of the pin 12a of the guide rail 1 with the groove 74 makes it possible to restrict the rotation of the clutch block 7 resulting from the urging force of the leaf spring 75, thereby holding the clutch block 7 so as to prevent a meshing engagement between the gear portion 71 and the spiral gear portion 10a of the cable 10.

Figure 13:
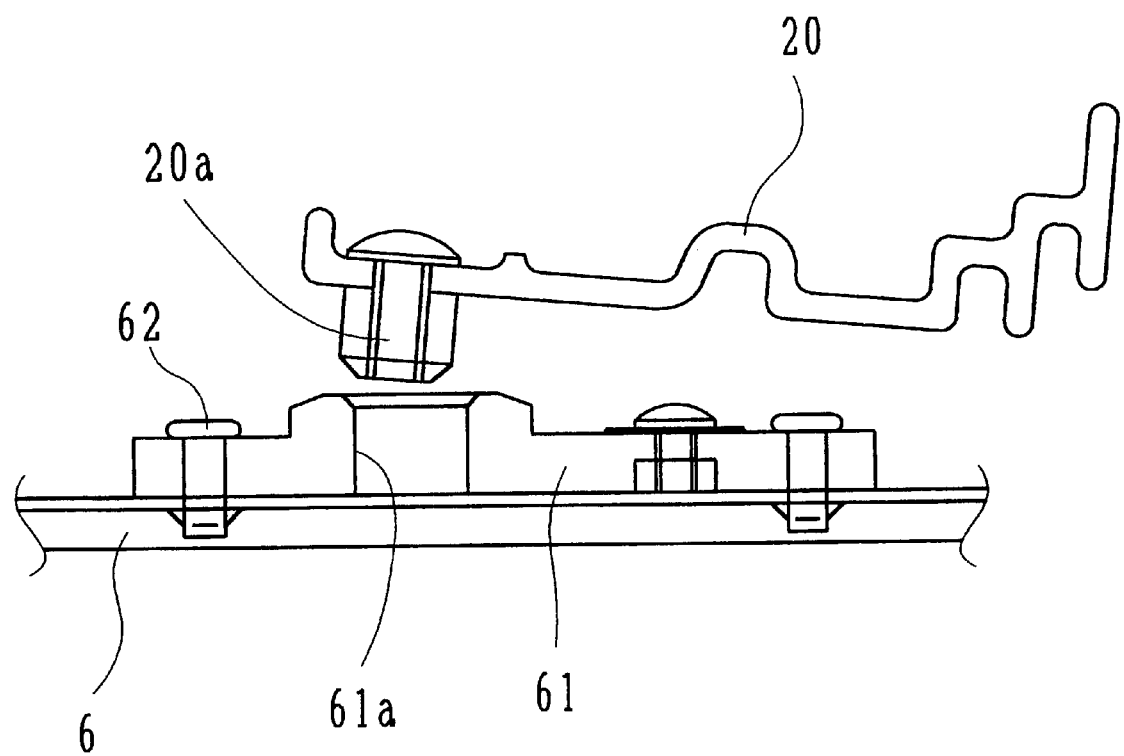
FIG. 13 illustrates a front view of an 'XIII' portion of the sunroof apparatus shown in FIG. 1.

As shown in FIGS. 1 and 13, at the rear (lower side in FIG. 1) portion of the outer panel 5, there is placed a rain channel so as to be in layer thereto which is of a known construction and which is in association with the outer panel 5 The rain channel 20 is fixed with a pin 20a which extends or projects toward the sunshade panel 6. The sunshade panel 6 is fixed with a block 61 by a pin 62. The block 61 is formed of a hole 61a which is capable of receiving the pin 20a.

It is to be noted that though not detailed in FIG. 1 end pieces 10c at the other end of the cable 10 and at the other end of the cable 11 are engageble with another clutch plate 2 and another clutch block 7, like the end pieces 10b and 11b, respectively.

Hereinafter, how the sliding roof apparatus operates is described in great detail.

Figure 2:
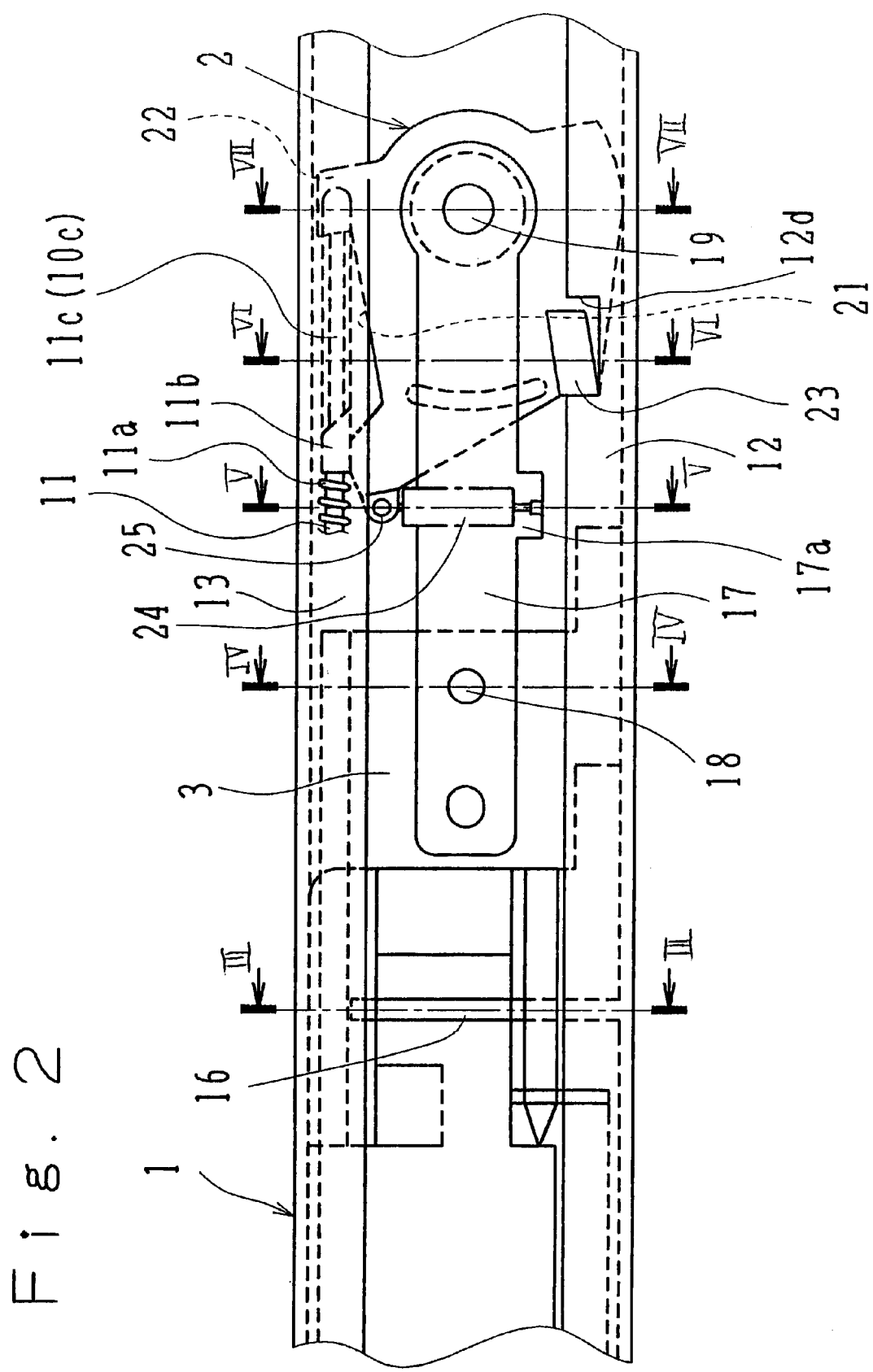
FIG. 2 illustrates a 'II' portion of the sunroof apparatus, in great detail, which is illustrated in FIG. 1.
Figure 3:
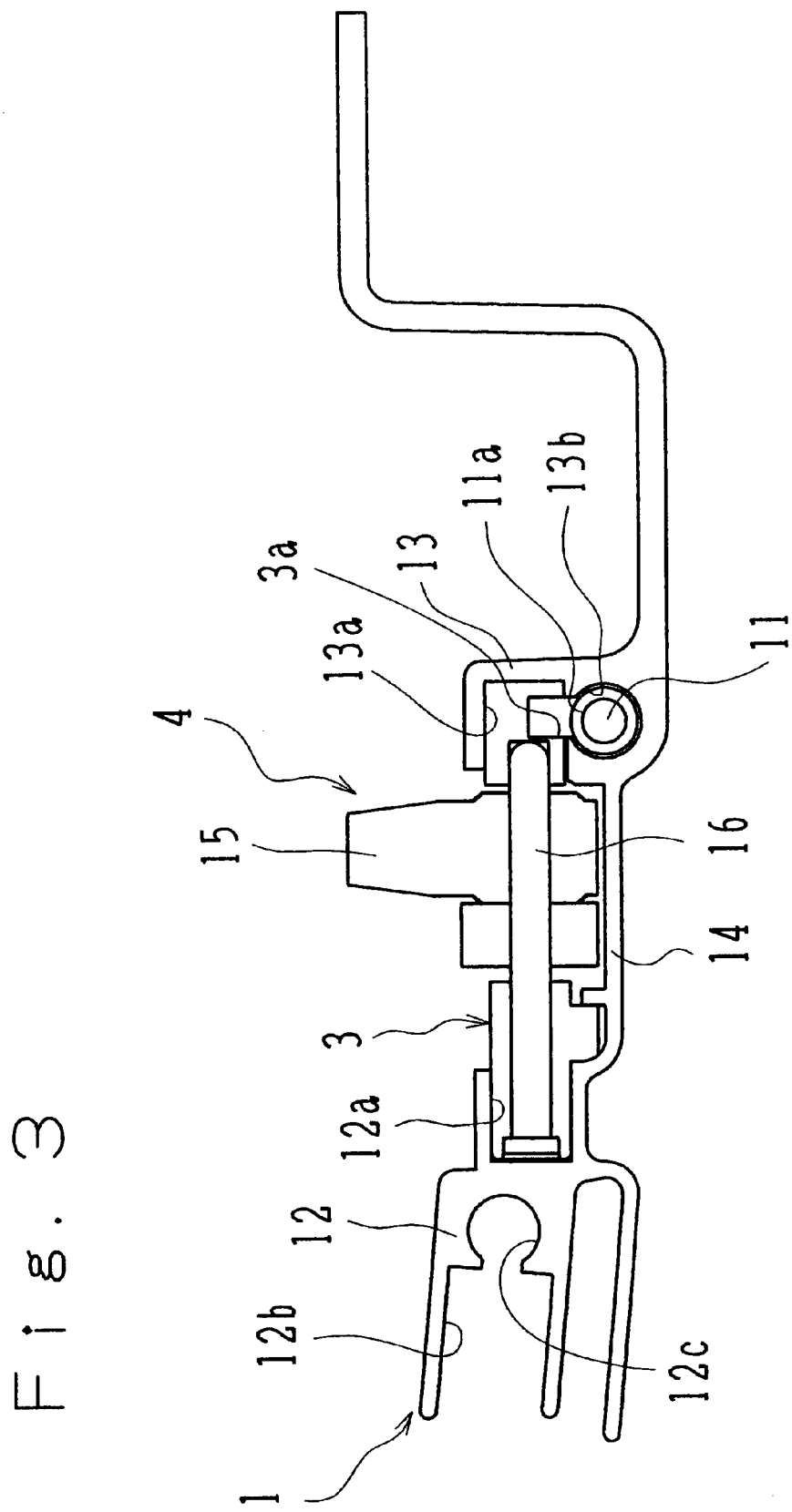
FIG. 3 illustrates a cross-sectional view of the sunroof apparatus taken along line III—III in FIG. 2.
Figure 4:
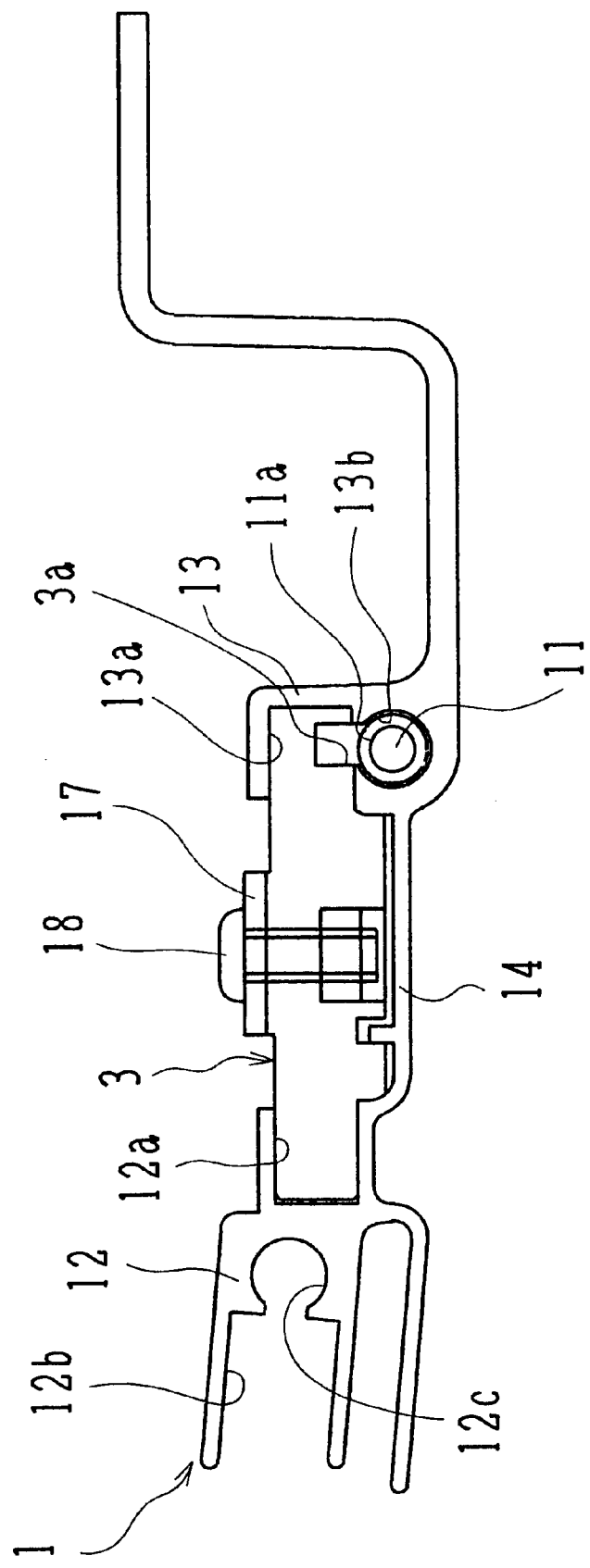
FIG. 4 illustrates a cross-sectional view of the sunroof apparatus taken along line IV—IV in FIG. 2.
Figure 5:
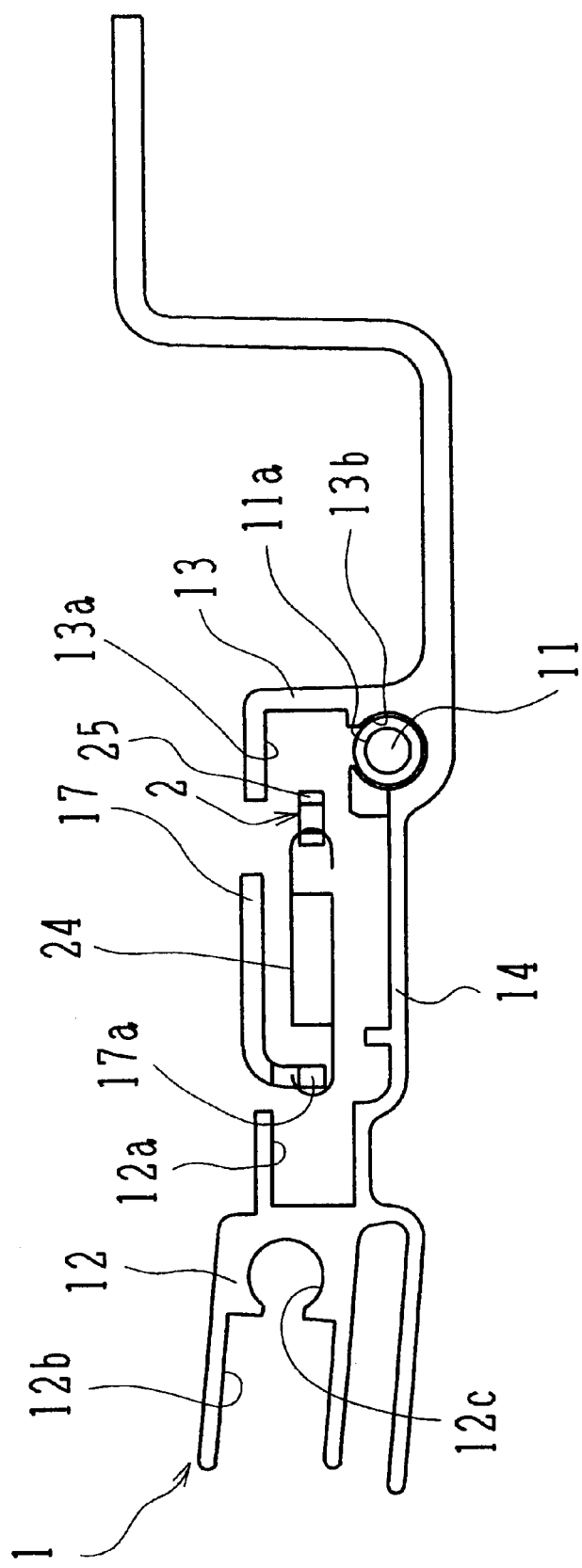
FIG. 5 illustrates a cross-sectional view of the sunroof apparatus taken along line V—V in FIG. 2.
Figure 6:
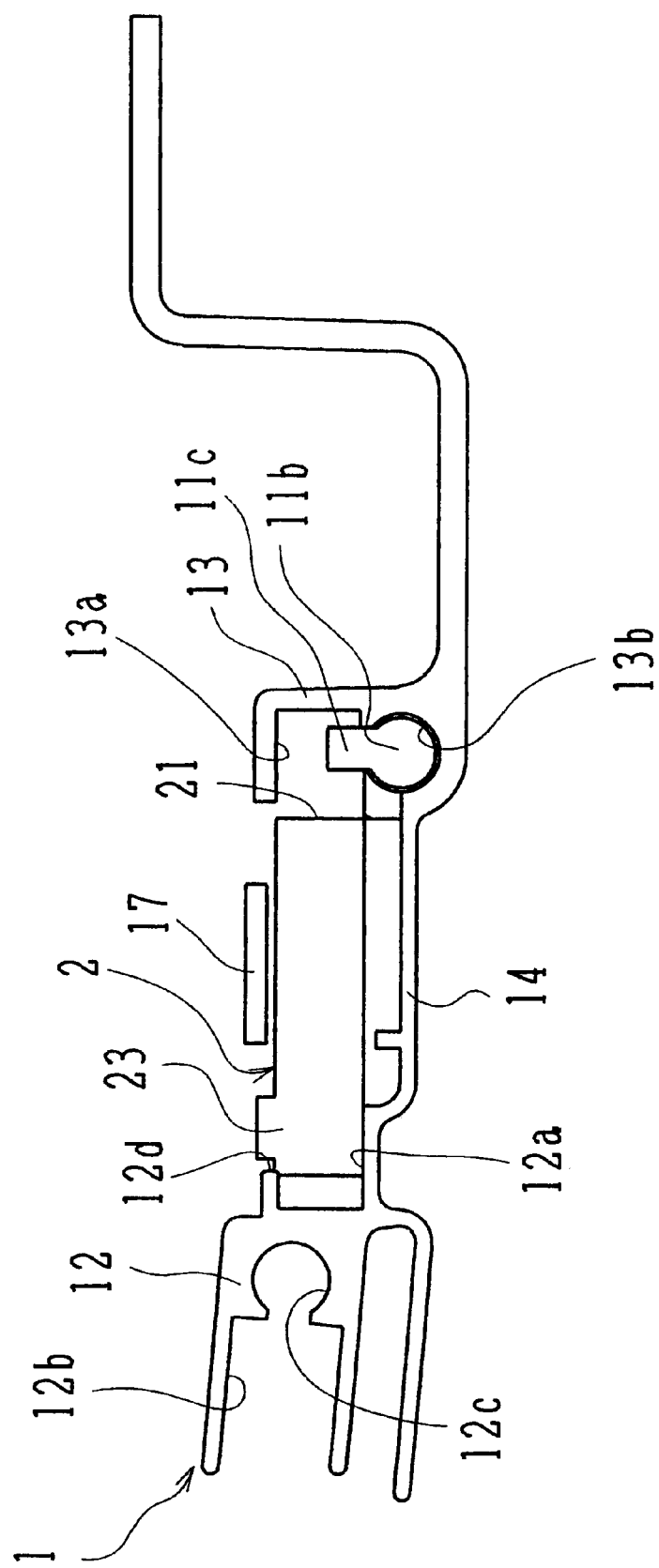
FIG. 6 illustrates a cross-sectional view of the sunroof apparatus taken along line VI—VI in FIG. 2.
Figure 7:
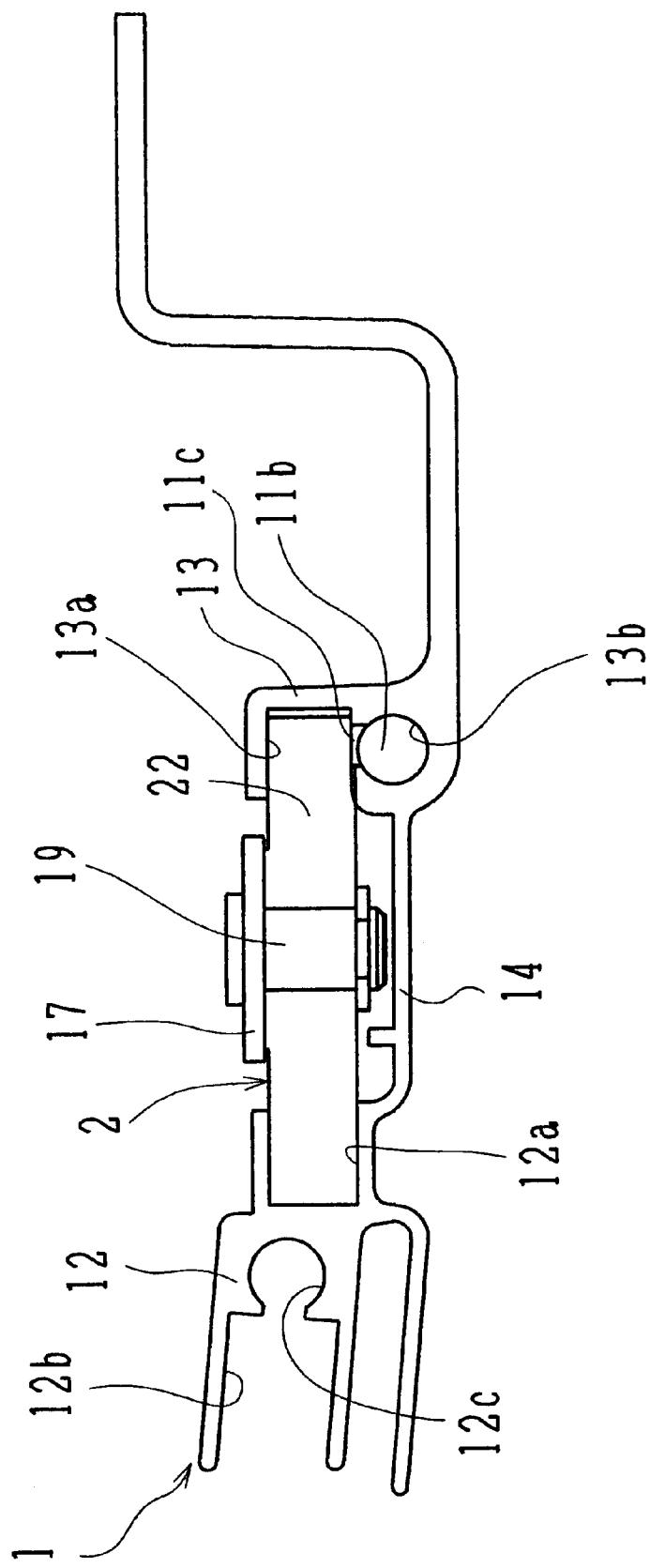
FIG. 7 illustrates a cross-sectional view of the sunroof apparatus taken along line VII—VII in FIG. 2.
Figure 8:
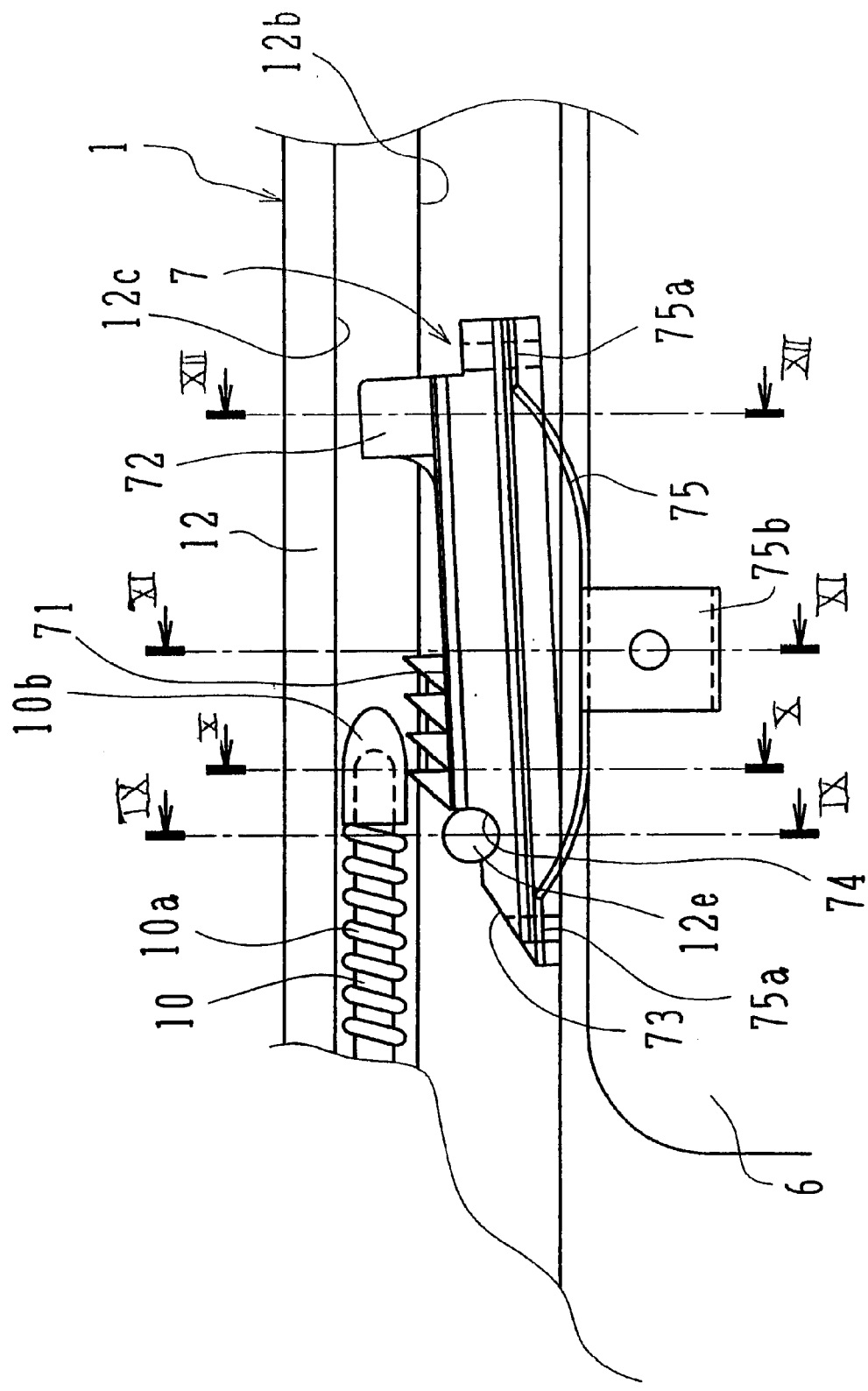
FIG. 8 illustrates an 'VIII' portion of the sunroof apparatus, in great detail, which is illustrated in FIG. 1.
Figure 9:
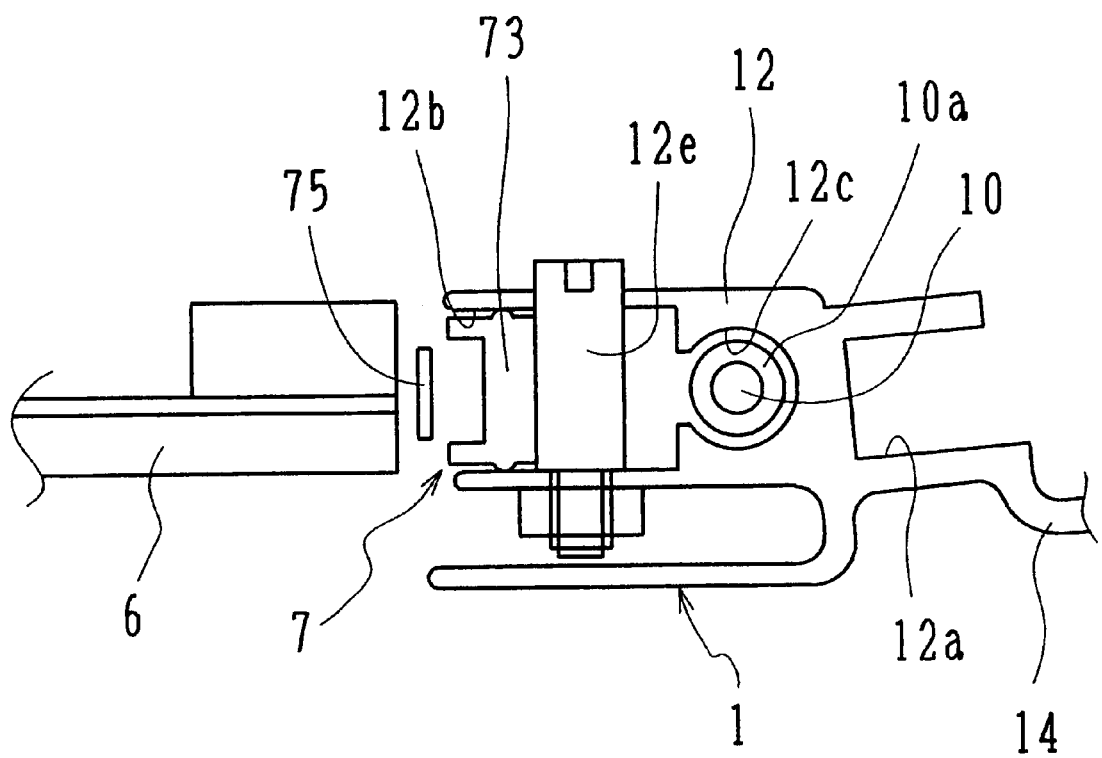
FIG. 9 illustrates a cross-sectional view of the sunroof apparatus taken along line IX—IX in FIG. 8.
Figure 10:
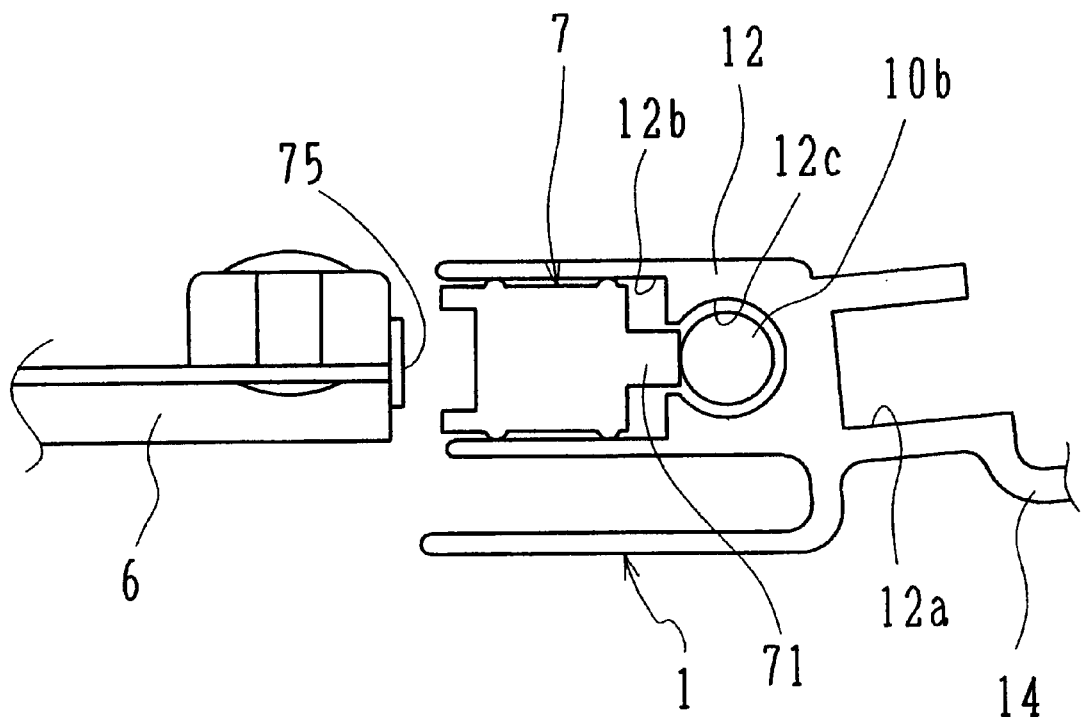
FIG. 10 illustrates a cross-sectional view of the sunroof apparatus taken along line X—X in FIG. 8.
Figure 11:
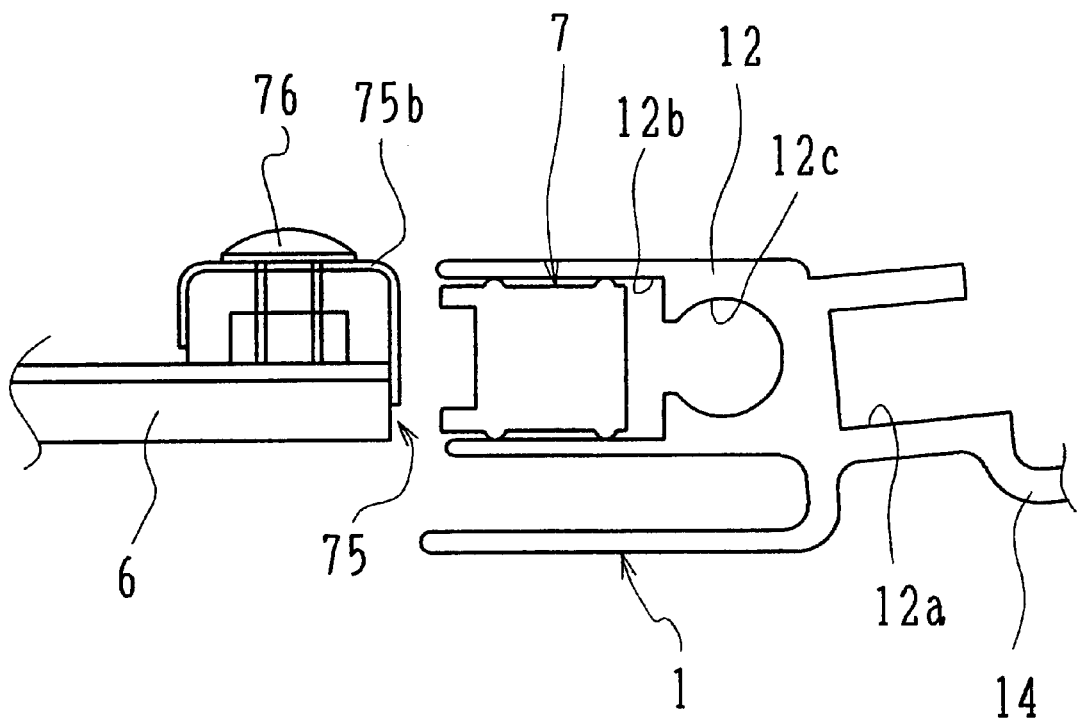
FIG. 11 illustrates a cross-sectional view of the sunroof apparatus taken along line XI—XI in FIG. 8.
Figure 12:
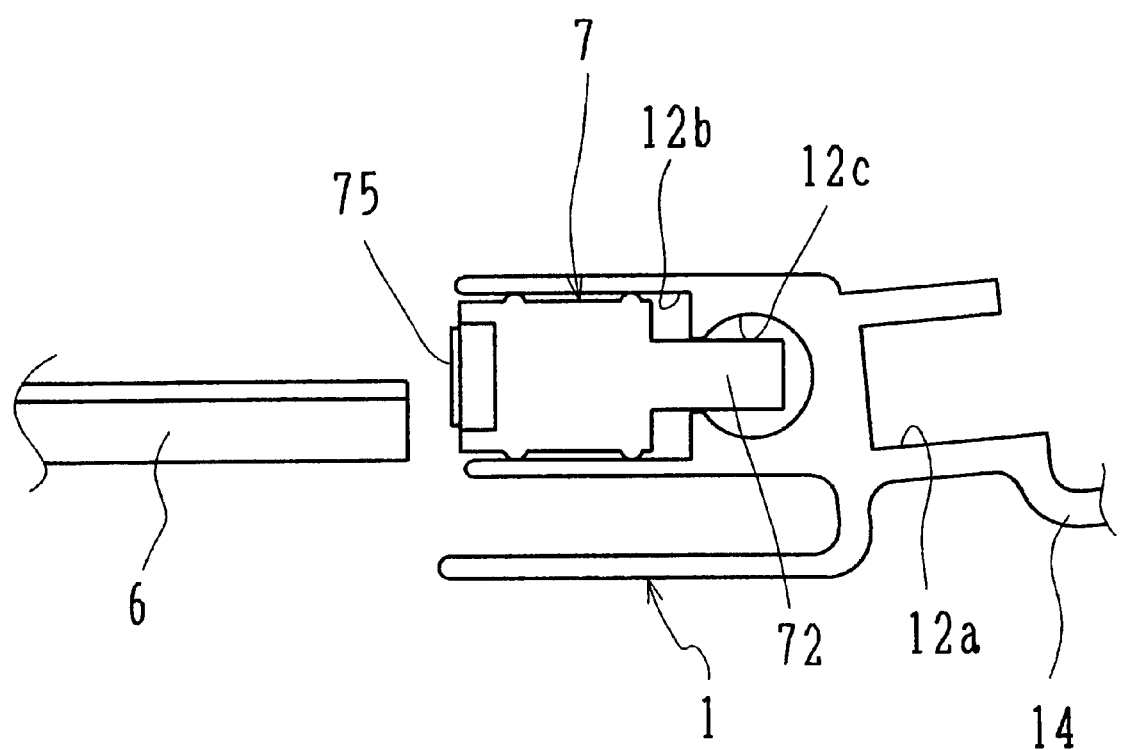
FIG. 12 illustrates a cross-sectional view of the sunroof apparatus taken along line XII—XII in FIG. 8.

FIG. 1 illustrates the roof panel open portion is in its closed state wherein this open portion is closed by the outer panel 5 which is covered with from the interior side by the sunshade panel 6. FIGS. 2, 8, and 13 illustrate states of the clutch plate 2, the clutch block 7, and the rain channel 20, respectively, under the FIG. 1-illustrating state. In regard to the clutch plate 2, its projection 23 is fitted into the notch 12d of the guide rail 1 and the notch 21 is out of engagement with the flanges 10c and 11c of the respective cables 10 and 11, thereby releasing or interrupting the engagement between the driving shoe 3 (i.e. the outer panel 5) and each of the cables 10 and 11. With respect to the clutch block 7, the groove 74 is in engagement with the pin 12e of the guide rail 1 and gear portion 71 is out of meshing engagement with the spiral gears 10a and 11a of the respective cables 10 and 11, thereby releasing or interrupting the connection between the sunshade panel 6 and each of the cables 10 and 11. As for the rain channel 20, its pin 20a is out of engagement with the hole 61a of the engaging block 62, thereby releasing or interrupting the connection between the rain channel 20 (i.e. the outer panel 5) and the sunshade panel 6.

Figure 14:
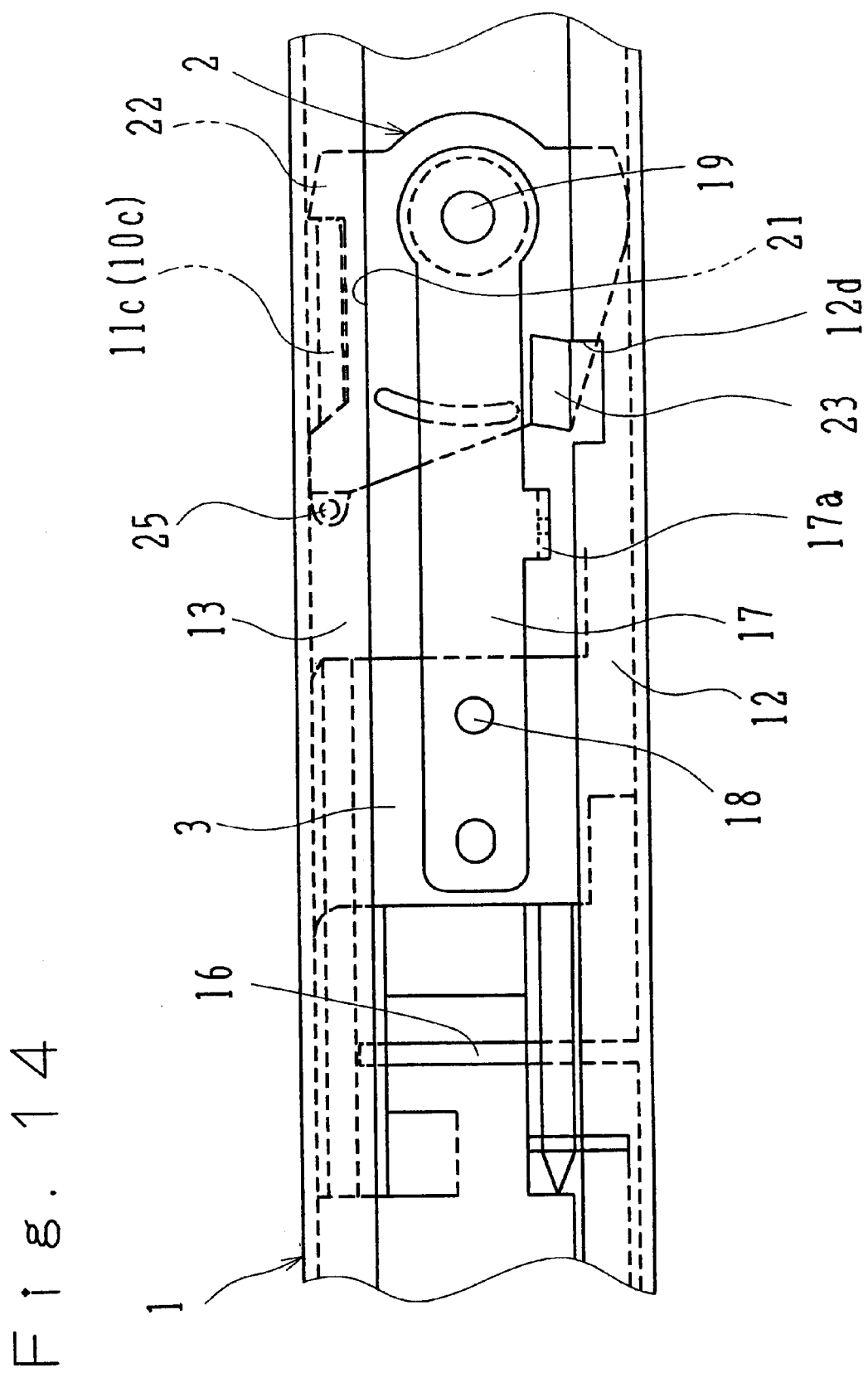
FIG. 14 illustrates a front view of a state which shows how operates a first clutch mechanism of the sunroof apparatus in accordance with the preferred embodiment of the present invention.

Under the illustrated states in FIGS. 1, 2, 8, and 13, when the driving mechanism 8 is turned on to rotate the output pinion gear 9 in one direction, the cable 10 and the cable 11 are moved in directions A and B, respectively, in FIG. 1. The resultant movements of the respective cable 10 and 11 causes the respective end pieces 10c and 11b to engage with the abutting wall 22 of the clutch plate 2, thereby rotating the clutch plate 2 in the clockwise direction in FIG. 2 against the urging force of the spring 24. As a result, as illustrated in FIG. 14, the projection 23 is made being out of engagement with the notch 12d and the notch 21 is made being engagement with the flange 11c, which results in that the driving show 3 is operatively connected to each of the cables 10 and 11 by way of the clutch plate 2. Thus, the driving force derived or outputted from the driving mechanism 8 is transmitted to the driving shoe 3 by way of the cables 10 and 11 and the clutch plate 2, thereby moving the driving shoe 3 in sliding manner, together with the latch plate 2, along the guide rail 1. The driving force issued from the driving mechanism 8 is never transmitted to the sunshade panel 6 due to the fact that the end pieces 10b and 11d of the respective cables 10 and 11 are moved away from the clutch block 7.

If the rotation of the output pinion gear 9 in one direction continues, the action of the link mechanism 4 which results from the sliding movement of the driving show 3 causes the outer panel 5 to lower. Then, in response to the resultant lowering movement of the rear end of the outer panel 5 the rain channel 20 begins to rotate, thereby engaging its pin 20a with the hole 61a of the block 61 which is secured to the sunshade panel 6. Thus, the outer panel 5 is brought into connection with the sunshade. panel 6 by way of the rain channel 6.

If rotation of the output pinion gear 9 in one direction continues further, the sliding movement of the driving shoe 3 causes the outer panel 5 and the rain channel 20 to slide in the vehicular rearward direction (opening direction) and the resultant sliding movement of the outer panel 5 in the opening direction is transmitted to the sunshade panel 6, thereby causing the sunshade panel 6 to slide in the vehicular rearward direction (opening direction). Thus, the roof panel open portion is made open state.

Figure 15:
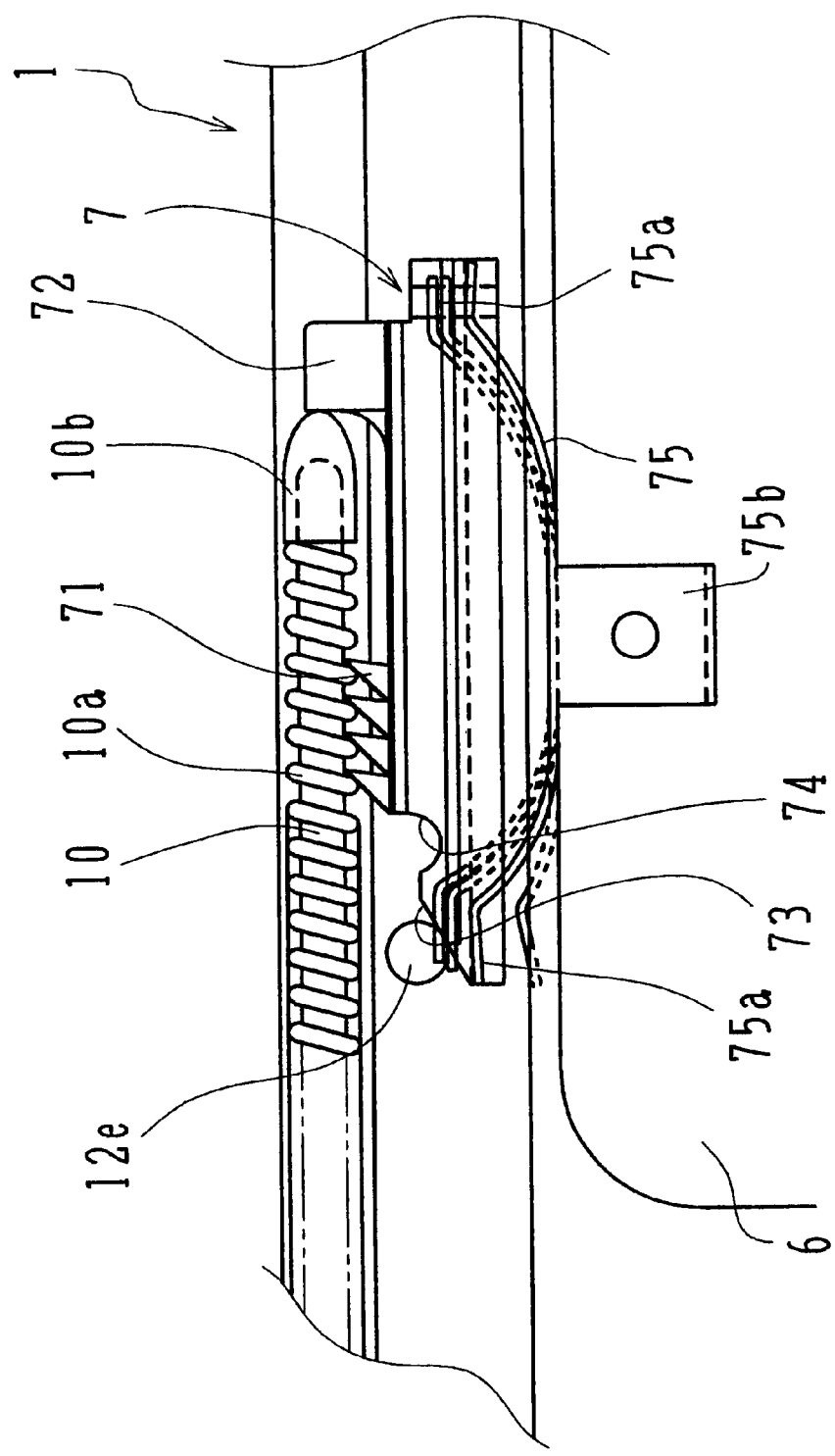
FIG. 15 illustrates a front view of a state which shows how operates a second clutch mechanism of the sunroof apparatus in accordance with the preferred embodiment of the present invention.

Under the concurrent states of FIGS. 1, 2, 8, and 13, contrary to the above, when the driving mechanism 8 is turned on to rotate the output pinion gear 9 in the other direction, the cables 10 and 11 are moved in the directions B and A, respectively, in FIG. 1. The resultant movements of the respective cable 10 and 11, the end pieces 10b and 11b of the respective cables 10 and 11 are brought into engagement with the abutting wall 72 of the clutch block 7 to push or urge the same, thereby sliding the clutch block along the guide rail 1. Thus, as shown in FIG. 15, the groove 74 of the clutch block 7 is made disengaged from the pin 12e of the guide rail 1, which causes the clutch block 7 to rotate in the clockwise direction in FIG. 8 by the urging force of the leaf spring 8, thereby engaging the gear portion 71 with the spiral gears 10a and 11a of the respective cables 10 and 11. As a result, the cables 10 and 11 are operatively connected to the sunshade panel 6 by way of the clutch block 7. Thus, the driving force outputted from the driving mechanism 8 is transmitted to the sunshade panel 6 by way of the cables 10 and 11, which causes the sunshade panel 6, together with the clutch block 7, to slide along the guide rail 1. The driving force issued from the driving mechanism 8 is never transmitted to the driving shoe 3 (i.e. outer panel 5) due to the fact that the end pieces 10c and 11b of the respective cables 10 and 11 are moved away from the clutch plate 2.

If the output pinion gear rotates further to continue in the other direction, the sunshade panel 6 is brought into sliding movement in the vehicular rearward direction (opening direction). This results in that with the roof panel open portion closed by the outer panel 5 only the sunshade panel can be made open state, which causes the outer panel 5 to expose, thereby making it possible to let light in the interior side through the outer panel 5.

Bringing the roof panel open portion from its open state to close state can be established by turning on the driving mechanism 8 to rotate the output pinion gear 9 in the other direction. Due to the fact that while the roof panel open portion is being in its open state the cables 10 and 11 are operatingly connected to the outer panel 5 by way of the clutch plate 2 and the outer panel 5 and the sunshade panel 6 are connected to each other by way of the rain channel 20, the driving force outputted from the driving mechanism 8 is transmitted to the outer panel 5 to slide the same in the vehicular frontward direction (closing direction) and is simultaneously transmitted from the outer panel 5 to the sunshade panel 6 to slide the same n the vehicular frontward direction (closing direction). When the roof panel open portion is made close state, the projection 23 of the clutch plate 2 opposes to the notch 12d of the guide rail 1 and is brought into re-engagement with the notch 12d when the clutch plate 2 is rotated by the urging force of the spring 24, thereby releasing or interrupting the connection of the notch 21 of the clutch plate 2 to the flanges 10c and 11c of the respective cables 10 and 11. Thus, the connection between the driving shoe (i.e. outer panel 5) and each of the cables 10 and 11 is released or interrupted. In addition, if the roof panel open portion is made close state, the groove 74 of the clutch block 7 is engaged with the pin 12e while the pin 12e is being in engagement with the slant surface 73. Thus, the connection between the slant surface 73 of the clutch block 7 and rotating the clutch block 7 against the urging force of the leaf spring 75 makes it possible to release the connection between the gear portion 71 of the clutch block 7 and each of the spiral gear 10a and 11a of the respective cables 10 and 11, thereby releasing or interrupting the connection between the sunshade panel 6 and each of the cables 10 and 11. Releasing or interrupting the connection between the outer panel 5 and the sunshade panel 6 cab be established by disengaging the pin 20a of the rain channel 20 from the hole 61a of the block 61 when the rain channel 20 is made rotated in response to the raising movement of the rear end of the outer panel 5 during the sliding movement of the outer panel 5 for the closure of the roof panel open portion.

Establishing a sliding movement of only the sunshade panel 6 from its open state to close state can be achieved by turning on the driving mechanism 8 to rotate the output pinion gear 9 in one direction due to the fact under the open state of only the sunshade panel 6 the cables 10 and 11 are connected to the sunshade panel 6 by way of the clutch block 7.

In the present embodiment, the clutch plate 2 and the driving shoe 3 are made separate which have a function to engage and disengage the outer panel 5 and each of the cables 10 and 11 and a function to support the outer panel in slidable mode, respectively. However, an integrated single member is available which is of these functions. In addition, though the sole clutch block 7 is of functions to engage and disengage the sunshade panel 6 and each of the cables 10 and 11 and to support the sunshade panel 6 in slidable mode, the functions can be carried out by separate members, respectively.

In accordance with the present invention, turning on the driving mechanism in one direction causes the outer panel to slide by way of the first clutch mechanism, while turning on the driving mechanism in the other direction causes the sunshade panel to slide by way of the second clutch mechanism. Thus, only the driving mechanism is capable of causing the outer panel and the sunshade panel to slide, which reduces the number of driving mechanisms, resulting in the number of parts, thereby reducing the production cost of the apparatus per se and simplifying the apparatus in control circuit.

The invention has thus been shown and description with reference to specific embodiments, however, it should be understood that the invention is in no way limited to the details of the illustrates structures but changes and modifications may be made without departing from the scope of the appended claims.

What is claimed is:

1. A sliding roof apparatus for a vehicle comprising:

an outer panel opening and closing an open portion formed in a vehicular roof panel;

a sunshade panel provided at an interior side of the vehicle relative to the outer panel and shading and exposing the interior side through the outer panel;

a driving mechanism associated with the outer panel and the sunshade panel;

a first clutch mechanism establishing engaged and disengaged states between the driving mechanism and the outer panel, the first clutch mechanism engages between the driving mechanism and the outer panel when the driving mechanism drives in one direction while the open portion is closed by the outer panel; and a second clutch mechanism establishing engaged and disengaged states between the driving mechanism and the sunshade panel, the second clutch mechanism engages between the driving mechanism and the sunshade panel when the driving mechanism drives in other direction while the open portion is closed by the outer panel.

2. The sliding roof apparatus according to claim 1 further comprising:

a cable associated with the driving mechanism and capable of being engaged with and disengaged from the outer panel by the first clutch mechanism at one end as well as capable of being engaged with and disengaged from the sunshade panel by the second clutch mechanism at other end.

3. The sliding roof apparatus according to claim 2 further comprising:

a pair of guide rails secured to the vehicular roof panel and support the outer panel and the sunshade panel;

a first connecting member slidably supported by the guide rail and engagable with the one end of the cable;

a second connecting member slidably supported by the guide rail and engagable with the other end of the cable.

4. The sliding roof apparatus according to claim 2 further comprising a third connecting member provided between the sunshade panel and the outer panel and establish and release a connection between the sunshade panel and the outer panel.

* * * * *